Feb. 21, 1967 E. FAGE 3,305,177
DISCHARGE NOZZLE FOR JET AIRCRAFT
Filed July 2, 1964 2 Sheets-Sheet 1
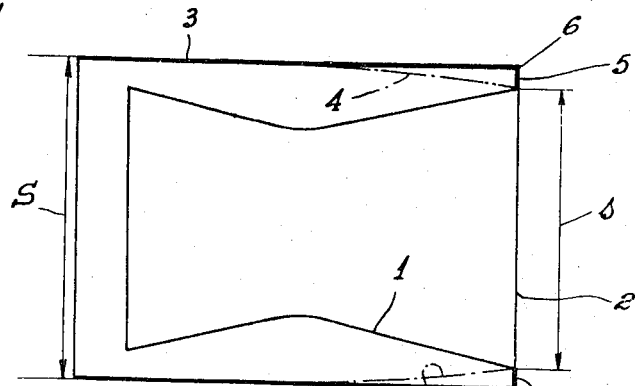
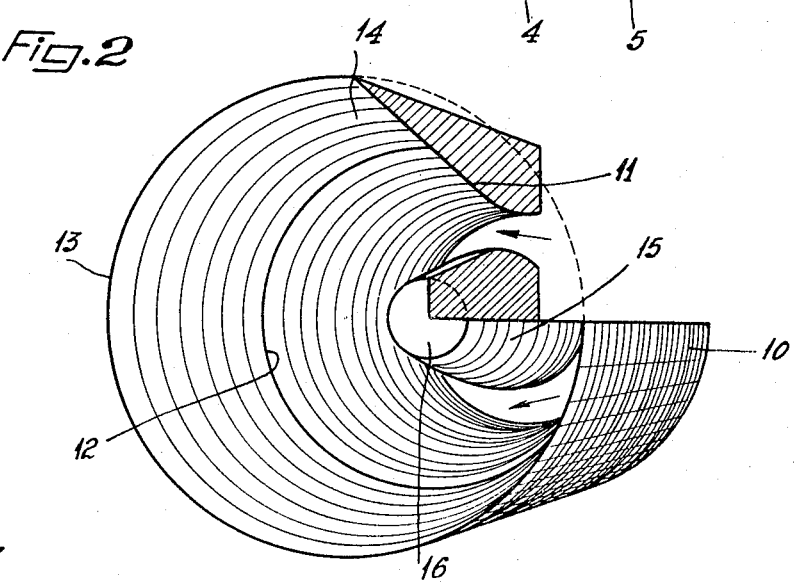
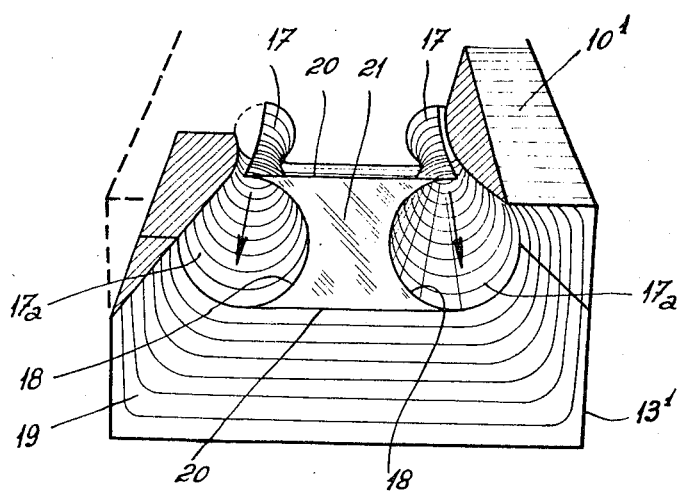

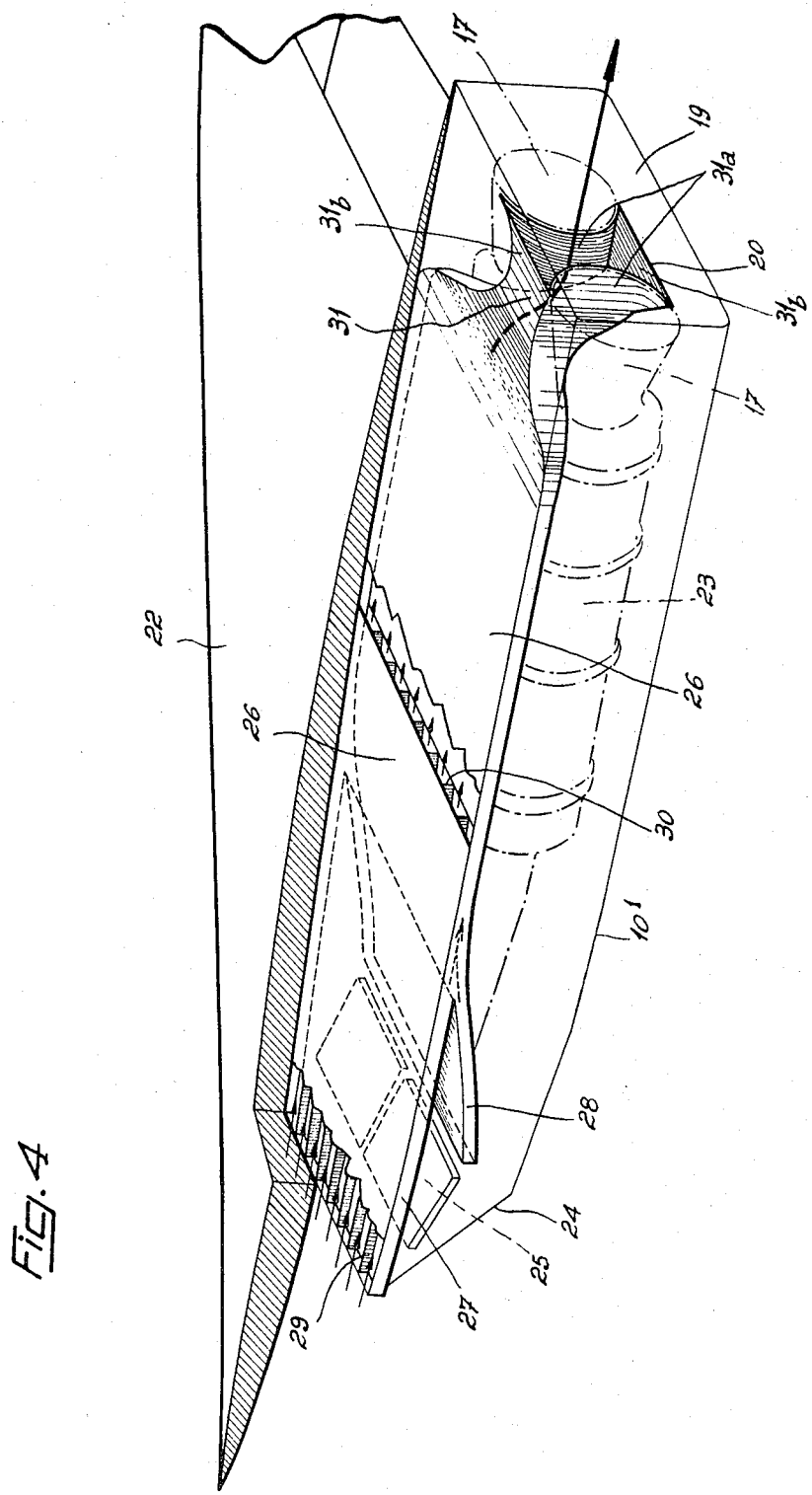

United States Patent Office 3,305,177
Patented Feb. 21, 1967

3,305,177
DISCHARGE NOZZLE FOR JET AIRCRAFT
Etienne Fage, Marly-le-Roi, France, assignor to Sud-Aviation, Societe Nationale de Constructions Aeronautiques, Paris, France, a company of France
Filed July 2, 1964, Ser. No. 379,851
Claims priority, application France, July 12, 1963, 941,313
4 Claims. (Cl. 239—127.3)

The reduction of drag is one of the main objectives of aircraft designers, and it is particularly important in the case of supersonic aircraft.

Among the causes of drag, there may be mentioned flow disturbances about the nozzles of jet engines and an object of the present invention is to provide improvements in such nozzles and in the connection of such nozzles to the cowling surrounding the jet engine, in order to reduce drag and in fact to eliminate it completely if possible, or even to obtain a thrust gain.

It is known that jet engine discharge nozzles for supersonic aircraft are constituted by covergent-divergent ducts, which may or may not be provided with an axial spindle member or cone.

The outlet cross-sectional area of the nozzles of an aircraft depends on the maximum speed proposed for the said aircraft and, generally, it is less than that of the maximum cross-section of the cowling of the jet engine or engines. Under the circumstances, usually the cowling is connected to the nozzle by profiling the rear end of the said cowling so as to make it join the outlet orifice of the nozzle and constitute a thin edge. Unless this connection is very gradual—which is often difficult to achieve owing to a shortage of space in the longitudinal sense—it gives rise, during flight, to an appreciable drag.

According to the present invention, the connection between the cowling and one or more nozzles is effected, leaving the said cowling with a substantially constant cross-section, by arranging the outlet orifice of the nozzle or nozzles in a withdrawn manner relatively to the trailing edge of the cowling and giving the said orifice a peripheral development sufficient to enable it to be connected to the trailing edge of the cowling by an evolutive surface which prolongs at least a portion of the walls of the nozzle or nozzles, and the outlet cross-section of the nozzle or nozzles is regulated to the desired value by limiting the said outlet cross-section towards the centre of the assembly formed by the cowling, the nozzle or nozzles and the evolutive surface.

When a single nozzle is concerned, limiting the outlet cross-section towards the centre can be effected by providing an aerodynamic obstacle such as a central spindle member of appropriate cross-section.

In the case of a plurality of nozzles, the evolutive surface advantageously connects the trailing edge of the cowling and a convex curve which envelops the outlet orifices of the nozzles, the latter being appropriately spaced from one another to permit the gradual connection of the external portions of their walls with the cowling, a simple shield possibly being provided between the portions of the walls of the nozzle adjoining the centre of the assembly in order to close the space left free between the nozzles and the connecting surface.

However, it is preferable in this case to use this space for passing therethrough a flow of air or auxiliary gas which also serves for example to cool the engine or the main structure, for conditioning air for the aircraft, for subjecting the boundary layer to a suction influence, etc., which makes it possible to increase thrust.

Experiments carried out by us have in fact shown that taking up the difference in cross-section between the cowling and the nozzle or nozzles not externally of the jet as with the known connecting methods mentioned at the beginning of the present specification, but within the jet or between several jets at high pressure, permitted not only of reducing drag but even of eliminating it and obtaining an over pressure ensuring a thrust gain.

In order to have the internal limits of the outlet cross-section unaffected by the influence of the ambient air, it is preferable to arrange them in a withdrawn manner relatively to the outlet plane of the cowling, in a zone where the pressure of the jet or jets is still broadly superior to the ambient pressure.

The invention is illustrated by way of example in the accompanying drawings, in which:

FIGURE 1 is a diagrammatic view illustrating two known methods of connection between a nozzle and a cowling;

FIGURE 2 shows diagrammatically, in perspective view partly in section, how a single nozzle can be connected according to the invention to a cowling;

FIGURE 3 shows in a similar manner a connection arrangement for a plurality of nozzles, and FIGURE 4 is a perspective view, partly broken away, showing a connection arrangement combined with an auxiliary discharge nozzle.

In FIGURE 1, a convergent-divergent nozzle 1 the outlet orifice 2 of which has a cross-section $s$ is to be connected to a cowling 3 of maximum cross-section $S$.

With the known methods, the orifice 2 is connected to the cowling 3 either by a tapering portion 4 (in dot-dash line) which is more or less gradual depending on the length available, or by means of a flat face 5, that is to say an annular diaphragm joining the edges 2 and 6 of the two elements. In both cases, a considerable drag is created.

In the form of embodiment of the invention shown in FIGURE 2, the cowling 10 surrounding a single nozzle 11 is of a substantially cylindrical form and, therefore, without any narrowing.

The theoretical outlet orifice 12 of the nozzle is situated in withdrawn manner relatively to the trailing edge 13 of the cowling and it has been given a sufficient development for it to be capable of being connected to the trailing edges 13 by an evolutive surface 14 which prolongs without an discontinuity the internal wall of the nozzle so as to give a connection ending in a thin edge.

The value of the cross-section of the nozzle is regulated by an aerodynamic obstacle of suitable cross-section such as a spindle member 15 arranged in the centre of the jet and preferably truncated at 16 in the plane of the cross-section 12.

In the modification shown in FIGURE 3, the cowling $10^1$ is of a substantially parallelepipedic form. Two nozzles 17 are arranged in this cowling, their outlet orifice 18 being withdrawn relatively to the trailing edge $13^1$. The connection between the cowling and the nozzles is provided by an evolutive surface 19 which connects the trailing edge $13^1$ to a convex curve 20 enveloping the outlet orifices of the nozzles. The spacing of the nozzles is sufficient for the surface 19 to prolong, without discontinuity, the external portions $17a$ of the internal lateral surface of the nozzles. A simple shield 21 may be provided, preferably in the plane of the outlet orifices 18, to close the free space between the said orifices and the base of the connecting surface 19.

Instead of closing this space, it is also possible to use it for ejecting an auxiliary air flow in that region, as FIGURE 4 shows.

The cowling $10^1$ represented diagrammetrically by its visible contour and which is assumed in the drawing to be transparent is suspended on the delta wing 22 of the aircraft (not shown). This cowling contains two turbojet engines 23 (shown in dot-dash lines) the nozzles 17 of which are arranged and disposed as described with reference to FIGURE 3 and more particularly are connected to the cowling by an evolutive surface 19.

The air inlet orifice 24 of the cowling comprises panels 25 the object of which is to oppose the shock wave at the entrance. A flat passage 26 interposed between the under-surface of the wing and the jet engines 23, serves as a boundary layer trap and is connected by two branches 27 and 28 to the upper and lower edges of the air inlet orifice 24. These branches are provided with internal partitions 29 and 30 serving as guide vanes, as the broken-away parts in FIGURE 4 show.

At its rear portion, the passage 26 terminates in a throat 31 forming an air outlet nozzle and providing a gradual connection with the periphery of the space left free between the two engine nozzles and the envelope 20 of their outlet orifices.

The two engine nozzles fit in the curved lateral walls 31a of the throat 31, whilst the transverse walls 31b are connected without any break in continuity with the adjacent portions of the surface 19.

The cowling $10^1$ and the aforesaid surface, and also the jet engines 23, have been shown only sketchily so as not to overload the drawings.

I claim:

1. A discharge nozzle assembly for jet aircraft comprising in combination: an elongated cowling having a substantially constant cross-section along its axis; a plurality of convergent-divergent engine nozzles of like size and design located in side-by-side relationship within said cowling in substantial parallelism with the axes thereof and having outlet orifices arranged forwardly of the trailing edge of said cowling in a common place substantially normal to said axis; a connecting member having a surface forming an extension of at least a portion of the diverging surface of said engine nozzles and connecting them to the trailing edge of said cowling; said surface of said connecting member connecting a curve which envelopes the outlet orifices of said engine nozzles to said trailing edge of said cowling, said connecting member including nozzle interconnecting means connecting together portions of the walls of said nozzles located within said curve.

2. A discharge nozzle assembly according to claim 1, wherein said nozzle interconnecting means is a shield for closing the space left free between said nozzles.

3. A discharge nozzle assembly according to claim 1, wherein said nozzle interconnecting means comprises a central nozzle, the outlet orifice of which is adapted to that of said engine nozzles and to the portion of said curve located between said engine nozzles.

4. The combination of claim 3, wherein means are provided for connecting said central nozzle to a passage adapted to supply cooling air thereto.

References Cited by the Examiner
UNITED STATES PATENTS

| | | | |
|---|---|---|---|
| 2,540,594 | 2/1951 | Price | 60—35.6 |
| 2,544,422 | 3/1951 | Goddard | 60—35.6 |
| 3,013,385 | 12/1961 | Kerry et al. | 60—35.6 |
| 3,041,825 | 7/1962 | Alford et al. | 60—35.6 |
| 3,127,740 | 4/1964 | Chamay | 60—35.6 |
| 3,221,496 | 12/1965 | Haake | 60—35.6 |

JULIUS E. WEST, *Primary Examiner.*